United States Patent [19]

Ludwig

[11] Patent Number: 5,341,347
[45] Date of Patent: Aug. 23, 1994

[54] ELECTRO ACOUSTIC TARGET SEARCHING SYSTEM FOR TORPEDOS

[76] Inventor: Reinhard Ludwig, Uhlenkrog 23, D-2300 Kiel, Fed. Rep. of Germany

[21] Appl. No.: 313,888

[22] Filed: Oct. 15, 1981

[30] Foreign Application Priority Data

Oct. 18, 1980 [DE] Fed. Rep. of Germany ....... 3039434

[51] Int. Cl.⁵ .............................................. G01S 3/80
[52] U.S. Cl. ..................................... 367/129; 367/118
[58] Field of Search ............... 367/117, 118, 129, 133, 367/92, 101; 114/20 R, 21 R, 21 W, 21 A, 23

[56] References Cited

U.S. PATENT DOCUMENTS

| | | | |
|---|---|---|---|
| 3,444,509 | 5/1969 | Rubega et al. | 367/92 |
| 3,890,913 | 6/1975 | Ellingson et al. | 114/20 R |
| 3,905,320 | 9/1975 | Mueller | 114/23 |
| 4,129,086 | 12/1978 | Schwarz | 114/23 |

Primary Examiner—Daniel T. Pihulic

[57] ABSTRACT

The present invention is an electro acoustic target searching system comprising receiving transducer means capable of receiving first, second and third frequencies, signal evaluation means for producing direction signals indicative of direction of reception of acoustic signals at any of the frequencies and logic means operable to control the frequency at which the evaluation means determines the direction of reception so that if a direction signal determined from evaluation at the lowest frequency exceeds a reference magnitude, evaluation is then made at the middle frequency, and if the resulting direction signals indicate receipt of acoustic signals exceeding a predetermined magnitude from a plurality of directions, evaluation is made at the highest frequency.

3 Claims, 1 Drawing Sheet

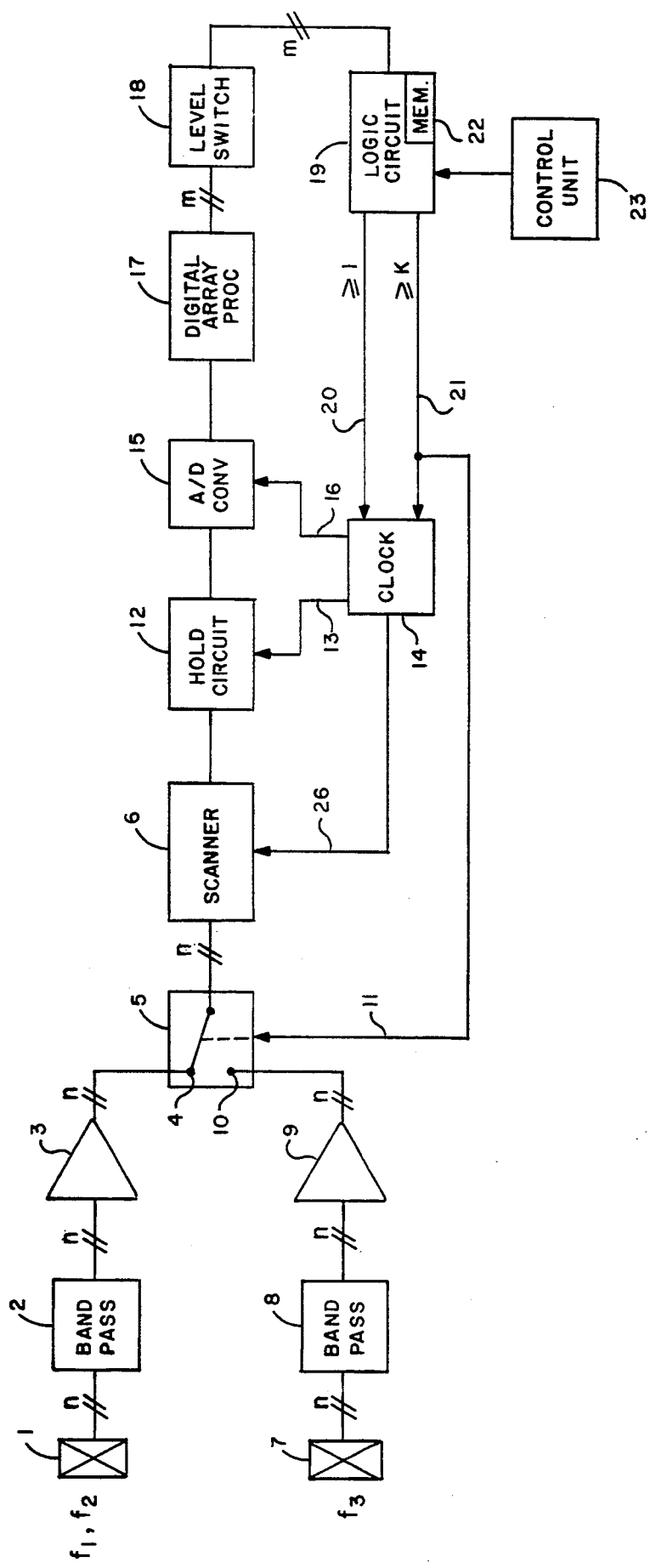

ELECTRO ACOUSTIC TARGET SEARCHING SYSTEM FOR TORPEDOS

BACKGROUND OF THE INVENTION

The invention relates to an electro acoustic target searching system for torpedos. It is known to provide in the head of the torpedo an electro acoustic transducer. The reception diagram can be tilted mechanically or electrically and automatically with its main sensitivity axis aligns itself to a noise source, usually the propeller of a ship which has to be attacked. For accurate localization of the target and control of the torpedo, the selection of the reception frequency of the transducer is of essential importance. In order to hinder localisation of the torpedo by the enemy the transducer as far as possible only operates passively, that means it only receives noise without itself transmitting sound pulses. During determined intervals of the travel of the torpedo in many cases a temporary active operation of the transducer is favorable. The size of the transducer is limited by the dimensions of the torpedo. The selection of the reception frequency depends on the expected noise spectrum of the target which is to be attached. However, the selection process must also take into account attenuation of sound waves in water which increases rapidly with increasing frequency. For a greatest possible reception range, therefore, an as low as possible reception frequency would be favorable. For achieving a suitable angular solution, however, mechanical dimensions of the transducer would be required which because of the limitations in space within the torpedo cannot be achieved.

A further point of view for the selection of a suitable reception frequency derives from the expected combat situation in which mostly a greater number of targets and therewith a greater number of noise sources are present simultaneously which furthermore by acoustic countermeasures try to hinder localisation. It is the object of the invention therefore to provide an electro acoustic target searching system for torpedos which in optimum manner takes care of the opposing requirements.

SUMMARY OF THE INVENTION

The present invention is an electro acoustic target searching system comprising receiving transducer means capable of receiving first, second, and third frequencies, signal evaluation means for producing direction signals indicative of direction of reception of acoustic signals at any of the frequencies and logic means operable to control the frequency at which the evaluation means determines the direction of reception so that if a direction signal determined from evaluation at the lowest frequency exceeds a reference magnitude, evaluation is made at the middle frequency, and if the resulting direction signals indicate receipt of acoustic signals exceeding a predetermined magnitude from a plurality of directions, evaluation is made at the highest frequency.

The lower frequency $f_1$ which preferably is lower than 20 kHz and e.g. lies between 10 and 20 kHz in view of the relatively low attenuation of low frequency sound waves in water achieves a large reception range so that the torpedo already at large distance from the target can localize this target and approach it. Because of the limited dimensions of the transducer, however, it is not possible to provide the transducer for the low frequency with a sufficiently sharp focusing. A low frequency for the remote localisation further is favorable because of the insitivity of the receiving transducer for the own noise generated by the torpedo.

When the torpedo gets sufficiently near the target that the target can be located and tracked with a higher frequency which provides less reception range, the receiving transducer and associated evaluation circuitry are switched to the middle frequency $f_2$ which preferably lies in the range between 20 and 60 kHz. This middle frequency combines for the target approach of the torpedo a good angular resolution with a sufficient reception range. If the torpedo approaches a single ship it can be reliably guided to the target by means of the above mentioned middle frequency. Difficulties, however, may arise if as usually several ships and noise sources simultaneously are present in the reception range of the middle frequency and therefore signals from different directions and distances are received. In this case it is desired to eliminate noise from remote targets or noise sources. If therefore on the frequency $f_2$ signals are received from several directions the searching system switches to a still higher frequency $f_3$ which e.g. might be higher than 100 kHz and which in consequence leads to a still further reduced reception range, Therewith some kind of distance curtain is formed for the sound waves coming from remote noise sources. Their noise does not reach the search system. This search system rather only recognizes targets to which the torpedo has already approached essentially.

For explaining the effectivity of the frequency switching short reference should be made to the frequency dependency of the attenuation $\alpha$ which for instance might be described by the empirical formula $$\alpha = 0{,}144\, f^{1{,}163}$$

in which the frequency f is inserted in kHz and the attenuation $\alpha$ is inserted in dB/km.

| f | α |
|---|---|
| 5 | 0,9 |
| 10 | 2,1 |
| 20 | 4,7 |
| 30 | 7,5 |
| 40 | 10,5 |
| 50 | 13.6 |
| 60 | 16,8 |
| 100 | 30,5 |
| 130 | 41,4 |
| 150 | 48,9 |
| 200 | 68,3 |

BRIEF DESCRIPTION OF THE DRAWING

The single figure of the drawing is a block diagram of an electro acoustic target searching system in accordance with the applicant's invention.

DESCRIPTION OF THE PREFERRED EMBODIMENT

In this embodiment the target searching system operates with three different frequencies $f_1$, $f_2$ and $f_3$. The increased expenses caused by the use of three different frequencies is reduced essentially by broadly using digital technique in particular for the direction forming, that means for the electronic directing of the transducer reception diagram. The change over from one frequency to another then can be achieved by switching the clock for digitizing the receiving signals and the circuit for the electronic direction forming.

Connected to the output of a first receiving transducer 1 which for instance is used for reception on the lower frequency $f_1$ and on the middle frequency $f_2$ are a band pass filter 2 and an amplifier 3 with the band pass filter preferably being switchable. Between these units multi line connections are provided in accordance to the number n of the transducer elements forming the transducer 1. This subdivision of the transducer into a number of transducer elements is necessary because of the desired direction forming and the required tiltability of the direction diagram. This in known manner is achieved by phase-shifted supply and interrogation respectively of the individual transducer elements or groups of transducer elements. Transducer 1 is used for frequencies $f_1$ and $f_2$. Since during passive operation the frequency dependency of the transducer is of less importance, it mainly is constructed such that it operates with optimum efficiency for the active operation which sometimes is necessary. This active operation preferably is performed at the middle frequency $f_2$. The outputs of amplifier 3 which perhaps may be a control amplifier are connected to a group of inputs 4 of a multiple switch 5. Connected to its output is a scanner 6. In the rhythm of the clock pulses fed to its control input 26 this scanner scans the input lines 4 and therewith the individual elements or groups of elements of transducer 1 one after the other. Switch 5 and scanner 6 together may form a multiplexer.

In principle, transducer 1 could also be used for reception of the higher frequency $f_3$. In order to achieve at this higher frequency a sufficient focusing of the reception diagram and its tiltability, however, transducer 1 had to be subdivided still further into individual elements or groups of elements compared with the operation at frequency $f_2$. It is therefore more favorable to use a separate transducer 7 for frequency $f_3$. With the same angular solution it can have essentially smaller dimensions than transducer 1 for frequency $f_2$.

In the embodiment it is assumed that also transducer 7 is subdivided into n transducer elements or groups of elements and in consequence is connected to subsequent band pass filter 8 tuned to frequency $f_3$ via n output lines. Again an amplifier 9 is connected to band pass filter 3 and the output lines of amplifier 9 are connected to a further group 10 of inputs of switch 5. As soon as switch 5 receives at its switching input 11 a switching signal it connects inputs 10 and therewith the individual transducer elements of transducer 7 with scanner 6 instead of previously having connected inputs 4 to scanner 6. In the embodiment both transducers 1 and 7 are subdivided each into an identical number n of transducer elements or groups of elements. This subdivision, however, can be different for both transducers.

Connected to switch 5 is scanner 6 via a number n of lines corresponding to the number of transducer elements. This scanner 6 transmits the signals in a time multiplex version via a line to hold circuit 12. This circuit is synchronized by clock signals from output 13 of clock 14 in the same manner as scanner 6. The same is true for the A/D converter 15 connected in series to the sample and hold circuit 6, 12. This converter converts the incoming analog signals into digital signals. For direction forming of the reception diagrams of transducers 1 and 7 respectively, and for tilting these reception diagrams a digital array processor 17 on microprocessor basis is provided which at its output has a number m of signal outputs corresponding to the number of directions which can be distinguished. Connected to each of these m outputs is a level detector 18 having a hysteresis which feeds an output signal and those outputs at the corresponding input of which an input signal is present which exceeds the switching level.

These direction-related output signals are fed to a logic circuit 19. The object and operation of which will now be explained in connection with the events when launching and controlling a torpedo. For allowing synchronization by means of a single clock as well as for avoiding undesired frequency changes the frequencies $f_1$, $f_2$ and $f_3$ are related to each other like whole numbers.

If the torpedo approaches the target from a large distance its target searching system in the first place is tuned to the lower frequency $f_1$. Therewith the largest possible reception range is achieved. When approaching the target or a group of potential targets in one of the m receiving systems of the array processor 17 a reception signal appears and indicates that in this direction a noise source is present. As soon as this signal increases so much that one can expect that it can be recognized also with the higher frequency $f_2$ its receiving level exceeds the switching value of level switch 18 so that on at least one of its m output lines a signal travels to logic circuit 19. This logic circuit recognizes that on one of the receiving beams, strong signal can be expected, and switches via line 20 clock 14 to frequency $f_2$. Scanning of the individual transducer elements of transducer 1 now is performed by scanner 6 with a scanning frequency which is associated to reception frequency f2. Accordingly also holding circuit 12 and A/D converter 15 are triggered with an increased clock frequency. Because of the hysteresis provided in level switches 18 the operation with frequency $f_2$ is continued also then if the direct dependent input signal temporary should fall below the switching level. Only if the target is lost completely and therewith on none of the output lines of level switch 18 a signal is present, a new searching interval with the lower frequency $f_1$ is started.

In combat situations with many noise sources, for instance fleets with several ships and additional noise buoys, strong signals will appear on several of the m reception beams. Accordingly several level switches 18 deliver an output signal. Logic circuit 19 can recognize this and in this case delivers on its output line 21 a switching signal which on the one side switches clock 14 to a clock frequency which is associated to the higher reception frequency $f_3$ and on the other side is present at the switching input 11 of switch 5 and switches it to group 10 of input lines which are in connection with transducer 7. If in this case because of the reduced reception range of frequency $f_3$ the reception signal should disappear on all m reception beams the logic circuit 19 will switch clock 14 and multiplexer 5, 6 back to the middle frequency $f_2$. A memory 22 in logic circuit 19 takes care that switching again to frequency $f_3$ cannot be performed before the expiration of a predetermined time interval. For switching from frequency $f_2$ to frequency $f_3$ the logic circuit, e.g. can be designed such that this switching only is accomplished if reception signals are simultaneously received from three adjacent reception directions. In this case it is of particular advantage to black out signals coming from remote noise sources by reducing the reception range.

If and as long as the torpedo is remotely controlled the automatic operation of logic circuit 19 if necessary can be overridden by remote control command signals. By means of a remote control unit 23 in this manner either by an operator or by means of signals from a supervising guiding system and intended frequency switching e.g. for classifying of targets can be reached.

The embodiments of the invention in which an exclusive property or right is claimed are defined as follows:

1. An electro acoustic target searching system comprising:
    receiving transducer means adapted to receive acoustic signal at first, second and third frequencies, the second frequency being higher than the first frequency and the third frequency being higher than the second frequency;
    signal evaluation means connected to said receiving transducer means and capable of determining the direction of reception of acoustic signals at any of the first, second and third frequencies and producing corresponding direction signals, the frequency at which evaluation is made to determine direction being controllable; and
    logic means connected to receive the direction signals from said signal evaluation means, and operable to control the frequency at which said evaluation means determines the direction of reception so that if a direction signal determined from evaluation at the first frequency exceeds a reference magnitude, evaluation is made at the second frequency, and if the resulting direction signals indicate receipt of acoustic signals exceeding the predetermined magnitude from a plurality of directions, evaluation is made at the third frequency.

2. The system according to claim 1 wherein the first, second and third frequencies are related to each other as whole numbers.

3. The system according to claim 2 wherein the first frequency is equal to or less than 20 KHZ, the second frequency is between 20 and 60 KHZ, and the third frequency is equal to or greater than 100 KHZ.

* * * * *